(12) United States Patent
Chun et al.

(10) Patent No.: US 10,891,075 B2
(45) Date of Patent: Jan. 12, 2021

(54) MEMORY SYSTEM AND OPERATING METHOD THEREOF

(71) Applicant: SK hynix Inc., Gyeonggi-do (KR)

(72) Inventors: Dong Yeob Chun, Seoul (KR); Hak Dae Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 190 days.

(21) Appl. No.: 16/116,327

(22) Filed: Aug. 29, 2018

(65) Prior Publication Data

US 2019/0235791 A1 Aug. 1, 2019

(30) Foreign Application Priority Data

Feb. 1, 2018 (KR) .................. 10-2018-0012922

(51) Int. Cl.
*G06F 3/06* (2006.01)
*G06F 1/324* (2019.01)
*G06F 9/48* (2006.01)

(52) U.S. Cl.
CPC ............ *G06F 3/0659* (2013.01); *G06F 1/324* (2013.01); *G06F 3/0604* (2013.01); *G06F 3/0625* (2013.01); *G06F 3/0679* (2013.01); *G06F 9/4893* (2013.01)

(58) Field of Classification Search
None
See application file for complete search history.

(56) References Cited

U.S. PATENT DOCUMENTS

| | | | | |
|---|---|---|---|---|
| 6,778,418 B2* | 8/2004 | Meguro | ................ | H02M 3/157 363/165 |
| 7,228,446 B2* | 6/2007 | Jorgenson | ............ | G06F 1/3203 713/322 |
| 9,477,586 B1* | 10/2016 | Hedinger | ................ | G06F 12/00 |
| 2009/0161428 A1* | 6/2009 | Unger | ...................... | G11C 5/14 365/185.09 |
| 2010/0034042 A1* | 2/2010 | Ben-Rubi | ................ | G11C 5/14 365/226 |
| 2012/0023351 A1* | 1/2012 | Wakrat | .................. | G06F 1/3203 713/322 |
| 2014/0100838 A1* | 4/2014 | Stelmakh | .............. | G06F 1/3206 703/21 |
| 2015/0269018 A1* | 9/2015 | Ellis | ..................... | G06F 11/2635 714/42 |
| 2019/0065089 A1* | 2/2019 | Myers | .................... | G06F 3/0625 |
| 2019/0094938 A1* | 3/2019 | Tidwell | ................... | G06F 1/329 |
| 2019/0138233 A1* | 5/2019 | Mun | ....................... | G06F 3/0625 |
| 2019/0235774 A1* | 8/2019 | Benisty | ................. | G06F 3/0679 |

FOREIGN PATENT DOCUMENTS

| | | |
|---|---|---|
| KR | 101019864 | 3/2011 |
| KR | 1020140102771 | 8/2014 |

* cited by examiner

*Primary Examiner* — Kaushikkumar M Patel
(74) *Attorney, Agent, or Firm* — IP & T Group LLP

(57) ABSTRACT

A memory system may include: a plurality of resources; and a frequency adjuster configured to adjust operating frequencies of the plurality of resources at a predetermined adjustment timing, wherein the adjustment timing comprises at least one timing for dividing partial operation periods of at least one resource among the plurality of resources.

21 Claims, 8 Drawing Sheets

FIG.4

RGPWT

| RS1 | Partial operation period | RG11 | RG12 |
|---|---|---|---|
| | Reference power consumption | PW11 | PW12 |
| RS2 | Partial operation period | RG21 | RG22 |
| | Reference power consumption | PW21 | PW22 |
| RS3 | Partial operation period | RG31 | RG32 |
| | Reference power consumption | PW31 | PW31 |
| ⋮ | ⋮ | ⋮ | ⋮ |

«MEMORY SYSTEM AND OPERATING METHOD THEREOF

CROSS-REFERENCE TO RELATED APPLICATION

The present application claims priority under 35 U.S.C. § 119(a) to Korean application number 10-2018-0012922, filed on Feb. 1, 2018, in the Korean Intellectual Property Office, which is incorporated herein by reference in its entirety.

BACKGROUND

1. Technical Field

Various embodiments generally relate to a memory system, and more particularly, to a memory system including a nonvolatile memory device.

2. Related Art

A memory system may be configured to store data provided from a host device in response to a write request of the host device, and to provide data stored therein to the host device in response to a read request of the host device. The host device is an electronic device capable of processing data, and may include a computer, digital camera, mobile phone or the like. The memory system may be embedded in the host device, or separately fabricated and connected to the host device.

SUMMARY

In an embodiment, a memory system may include: a plurality of resources; and a frequency adjuster configured to adjust operating frequencies of the plurality of resources at a predetermined adjustment timing, wherein the adjustment timing comprises at least one timing for dividing partial operation periods of at least one resource among the plurality of resources.

In an embodiment, there is provided an operating method of a memory system, including adjusting operating frequencies of a plurality of resources at a predetermined adjustment timing, wherein the adjustment timing comprises at least one timing for dividing partial operation periods of at least one resource among the plurality of resources.

In an embodiment, a memory system may include: a memory device; and a controller configured to control the memory device, wherein the controller includes a plurality of resources, each corresponding to a hardware element for at least one operation of the memory device, and a frequency adjuster configured to adjust an allowable amount of power for each of the plurality of resources at a set adjustment timing based on a power budget and priorities of the plurality of resources

BRIEF DESCRIPTION OF THE DRAWINGS

FIG. 4 illustrates a table indicating the relationship between partial operation period and reference power consumption.

DETAILED DESCRIPTION

Figure 1:
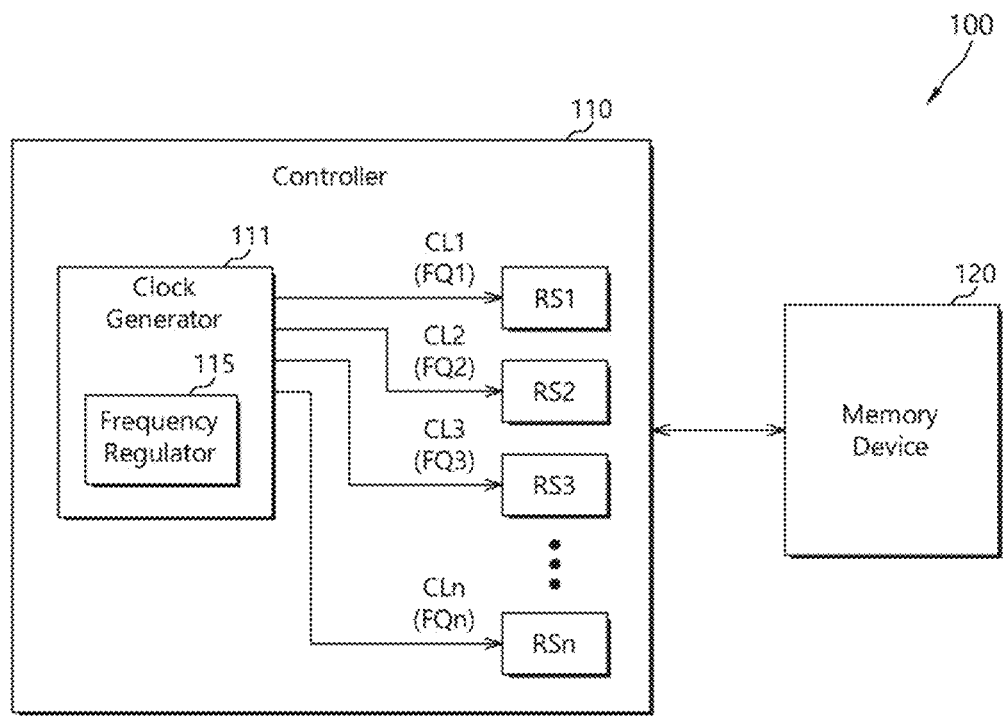
FIG. 1 is a block diagram illustrating a memory system in accordance with an embodiment.

A memory system and an operating method thereof according to embodiments of the present invention will be described with reference to the accompanying drawings. The present invention may, however, be embodied in different forms and should not be construed as being limited to the embodiments set forth herein. Rather, these embodiments are provided to describe the present invention in detail to the extent that a person skilled in the art to which the invention pertains can practice the present invention. Also, throughout the specification, reference to "an embodiment," "another embodiment," or the like is not necessarily to only one embodiment, and different references to any of these phrases are not necessarily to the same embodiment(s).

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms and vice versa, unless the context clearly indicates otherwise. It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Various embodiments of the present invention will be described in detail with reference to the attached drawings.

FIG. 1 is a block diagram illustrating a memory system 100 in accordance with an embodiment.

The memory system 100 may be configured to store data provided from an external host device (not shown), in response to a write request of the host device. Furthermore, the memory system 100 may be configured to provide data stored therein to the host device, in response to a read request of the host device.

The memory system 100 may include any one of a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD), and the like.

The memory system 100 may include a controller 110 and a memory device 120.

The controller 110 may control the overall operations of the memory system 100. The controller 110 may access the memory device 120 to process a request of the host device. The controller 110 may access the memory device 120 to perform an internal management operation or background operation of the memory system 100 in the absence of a request of the host device.

The controller 110 may include a dock generator 111 and a plurality of resources RS1 to RSn.

The clock generator 111 may generate dock signals CL1 to CLn having frequencies FQ1 to FQn, respectively, and provide the generated clock signals to the respective resources RS1 to RSn. The frequencies FQ1 to FQn of the clock signals CL1 to CLn may be equal to or different from each other.

The clock generator 111 may not provide clock signals to one or more resources of the resources RS1 to RSn. For example, the clock generator 111 may not supply a clock signal to a resource which is not currently operated. For another example, when a power budget of the memory system 100 is low, the clock generator 111 may not supply a clock signal to a resource having a low priority, such that the resource temporarily stops its operation.

The operating frequency of a certain resource may indicate the frequency of a clock signal provided to the corresponding resource. For example, the operating frequency of the first resource RS1 may correspond to the frequency FQ1 of the clock signal CL1 provided to the first resource RS1. When the operating frequencies of the resources RS1 to RSn are increased, the resources RS1 to RSn may consume a larger amount of power while their processing speeds increase. Therefore, when the operating frequencies FQ1 to FQn of the resources RS1 to RSn are adjusted, the total power consumption of the resources may be controlled.

The clock generator 111 may include a frequency adjuster 115. The frequency adjuster 115 may adjust the frequencies of the clock signals CL1 to an. In other words, the frequency adjuster 115 may adjust the operating frequencies FQ1 to FQn of the resources RS1 to RSn. More specifically, the frequency adjuster 115 may adjust the operating frequencies of resources which are operated at the same time, among the resources RS1 to RSn.

The frequency adjuster 115 may adjust the operating frequencies FQ1 to FQn at a predetermined adjustment timing. The frequency adjuster 115 may adjust the operating frequencies FQ1 to FQn at the adjustment timing, such that the sum of power consumption amounts of the resources RS1 to RSn becomes less than a predetermined power budget. The power budget may indicate total power which can be provided to the resources RS1 to RSn in order to normally operate the memory system 100.

The frequency adjuster 115 may divide the power budget into allowable amounts of power for the resources RS1 to RSn, in order to adjust the operating frequencies FQ1 to FQn of the resources RS1 to RSn. The amount of power to be allowed (allowable power) to a certain resource may indicate power to be consumed by the corresponding resource. The operating frequency of a certain resource may be determined according to the magnitude of the allowable power of the corresponding resource.

Figure 2:
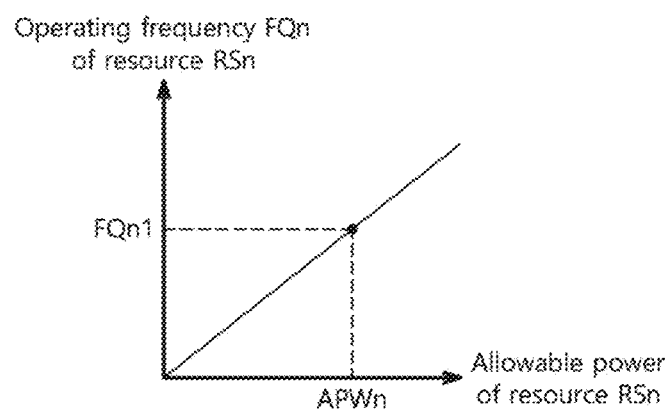
FIG. 2 is a graph illustrating the relation between allowable amount of power and operating frequency for a certain resource.

FIG. 2 is a graph illustrating the relation between the allowable power and the operating frequency of a certain resource RSn. In FIG. 2, the horizontal axis may indicate the allowable power of the resource RSn, and the vertical axis may indicate the operating frequency FQn of the resource RSn.

The relation between the allowable power and the operating frequency FQn may be determined through an operation of observing a change of power consumption depending on a change in operating frequency FQn of the resource RSn through an experiment in advance. The relation between the allowable power and the operating frequency FQn may be generated as an allowable power-to-operating frequency table (operating frequency table). The operating frequency table may be stored in a memory to which the frequency adjuster 115 can refer. The operating frequency table may include the value of the operating frequency FQn, corresponding to the value of the allowable power for the resource RSn. The operating frequency table may further include the relation between allowable power and operating frequency for each of one or more resources.

In FIG. 2, the relation between the allowable power and the operating frequency FQn may be expressed as a linear function. However, the present invention is not limited thereto.

When the operating frequency FQn is determined according to the relation of FIG. 2, the frequency adjuster 115 of FIG. 1 may set the operating frequency FQn of the resource RSn to a value FQn1 in the case where allowable power APWn is allowed to the resource RSn.

Referring back to FIG. 1, the frequency adjuster 115 may determine the allowable amounts of power for the respective resources RS1 to RSn, and determine the operating frequencies FQ1 to FQn of the resources RS1 to RSn based on the allowable amounts of power.

The reference operating frequency of a resource may indicate an operating frequency which is basically set for the corresponding resource. That is, the reference operating frequency of a certain resource may indicate the operating frequency of the corresponding resource in the case where the frequency adjuster 115 does not perform a frequency adjustment operation.

The reference power consumption of a resource may indicate a power consumption amount when the resource operates at the reference operating frequency. The reference power consumption may be calculated through an experiment in advance.

When the sum of the reference power consumption amounts of resources in operation among the resources RS1 to RSn exceed the power budget at the adjustment timing, the frequency adjuster 115 may determine the operating frequencies by adjusting the reference operating frequencies of the resources. When the sum of the reference power consumption amounts of the resources in operation does not exceed the power budget at the regulation timing, the frequency adjuster 115 may retain the reference operating frequencies as the operating frequencies.

In another embodiment, when the allowable power of a certain resource is determined, the frequency adjuster 115 may determine the operating frequency of the corresponding resource by adjusting the reference operating frequency according to the ratio of the allowable power to the reference power consumption of the corresponding resource. For example, when the ratio of the allowable power to the reference power consumption of a certain resource is 1, the frequency adjuster 115 may retain the reference operating frequency of the corresponding resource. For example, when the ratio of the allowable power to the reference power consumption of a certain resource is 0.5, the frequency adjuster 115 may reduce the reference operating frequency of the corresponding resource to half of its initial frequency, and set the halved reference operating frequency to the operating frequency.

The frequency adjuster 115 may adjust the operating frequencies FQ1 to FQn at one or more adjustment timings. The operating frequencies FQ1 to FQn determined at certain regulation timing may be retained until the next adjustment timing.

The adjustment timing may include one or more timings for dividing partial operation periods of one or more resources in operation. For example, the adjustment timing may include the timing at which a resource starts and/or ends operation. For example, the adjustment timing may include one or more timings for distinguishing a peak power operation period in the operation period of the resource. The adjustment timing may include the timing at which the reference power consumption of a resource is rapidly changed. Furthermore, the adjustment timing may include the timing at which the operation of the resource has been performed up to a predetermined progress.

In another embodiment, the frequency adjuster 115 may give priorities to the resources RS1 to RSn at the adjustment timing, and determine allowable amounts of power of the resources RS1 to RSn according to the priorities. Specifically, when the priority of a certain resource is higher or greater than a reference level, the frequency adjuster 115 may decide the allowable power of the corresponding resource, such that the ratio of the allowable power to the reference power consumption of the resource becomes higher than a reference ratio. For example, when the priority of a certain resource is higher than the reference level, the ratio of the allowable power to the reference power consumption of the corresponding resource may be set to 1.

In another embodiment, the frequency adjuster 115 may divide the power budget into the allowable amounts of power of resources having the same priority at the adjustment timing, according to the ratios of the allowable amounts of power to the reference power consumption amounts of the corresponding resources.

The resources RS1 to RSn may be power-consuming hardware elements including at least one of a core, central processing unit (CPU), direct memory access (DMA), bus, driver and input/output (I/O) device as hardware. Each of the resources RS1 to RSn may be related to at least one operation of the memory device 120. The resources RS1 to RSn may receive the clock signals CL1 to CLn, respectively, and operate using the frequencies FQ1 to FQn of the dock signals CL1 to CLn as their operating frequencies.

The memory device 120 may store data received from the controller 110, or read data stored therein and transfer the read data to the controller 110, according to control of the controller 110.

The memory device 120 may include a nonvolatile memory device or volatile memory device. The nonvolatile memory device may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like. The volatile memory device may include a Static Random Access Memory (SRAM), Dynamic Random Access Memory (DRAM) and the like.

Figure 3A:
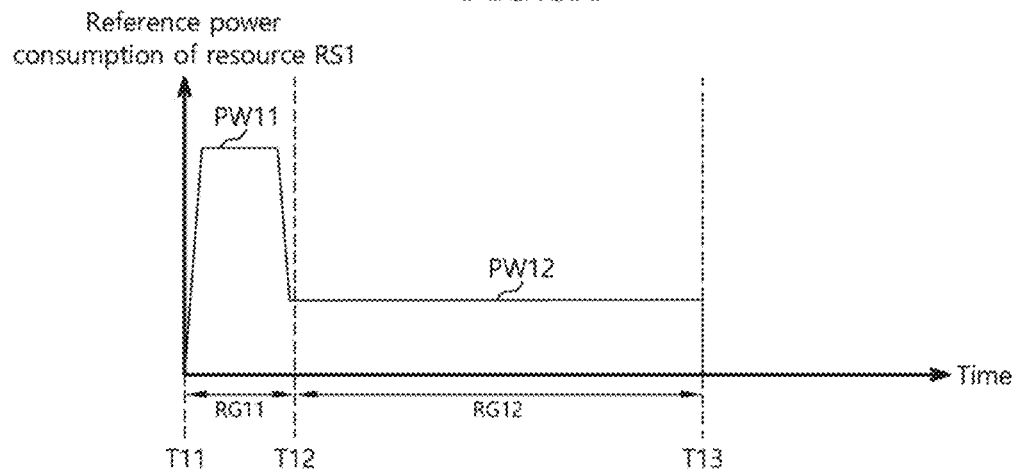
FIGS. 3A to 3C illustrate examples of adjustment timings for different resources.
Figure 3B:
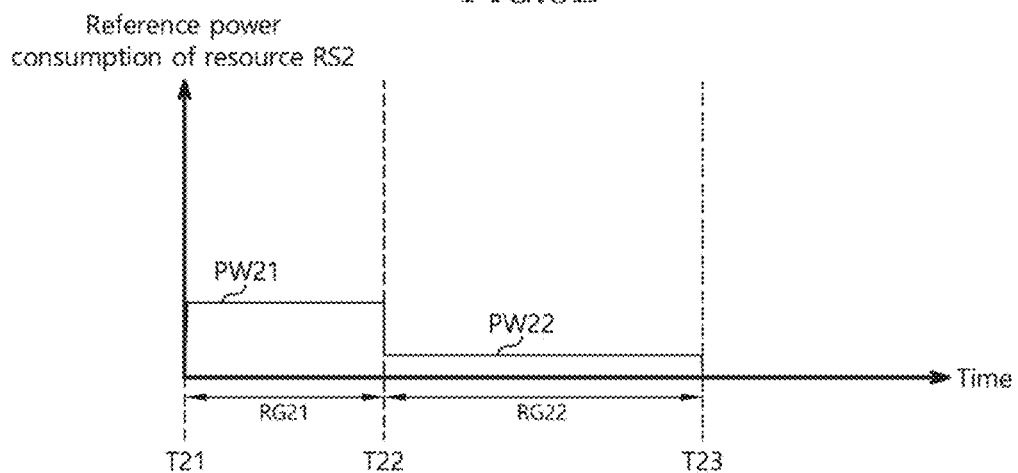
Figure 3C:
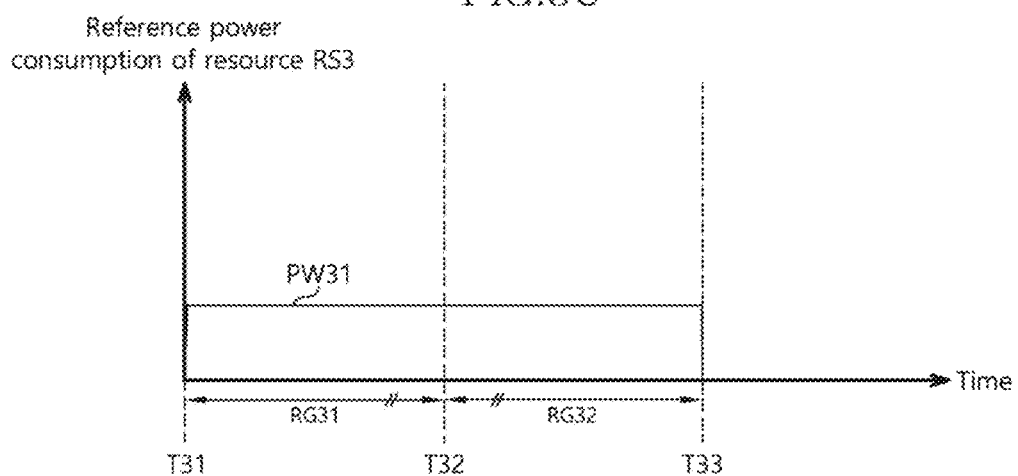

FIGS. 3A to 3C illustrate examples of adjustment timings for the first to third resources RS1 to RS3 of FIG. 1. The graphs of FIGS. 3A to 3C show the reference power consumption amounts of the first to third resources RS1 to RS3 depending on time. When the power budget is sufficient, each of the first to third resources RS1 to RS3 will operate while consuming its reference power consumption.

As described above, the frequency adjustment operation may be performed according to a result obtained by determining whether the power budget is insufficient at the adjustment timing. The adjustment timing may indicate timing for dividing partial operation periods of a resource in operation.

Referring to FIG. 3A, the entire operation period of the first resource RS1 may be divided into partial operation periods RG11 and RG12. During the partial operation period RG11 from timing T11 to timing T12, the first resource RS1 may consume peak power PW11. The partial operation period RG12 from timing T12 to timing T13 may correspond to the remainder of the entire operation period, excluding the partial operation period RG11.

The adjustment timing related to the first resource RS1 may include one or more timings. In the illustrated embodiment, there are three (3) timings T11 to T13. The frequency adjuster 115 may determine whether the sum of reference power consumption amounts of all resources in operation, which include the first resource RS1, exceeds the power budget at the adjustment timing related to the first resource RS1, and determine the operating frequencies according to the determined result.

Referring to FIG. 3B, the entire operation period of the second resource RS2 may be divided into partial operation periods RG21 and RG22. During the partial operation period RG21 from timing T21 to timing T22, the second resource RS2 may consume reference power PW21. During the partial operation period RG22 from timing T22 to timing T23, the second resource RS2 may consume reference power PW22. That is, the entire operation period of the second resource RS2 may be divided into the partial operation periods RG21 and RG22 at the timing T22, at which time the reference power consumption of the second resource RS2 is rapidly changed, although peak power is not consumed.

The adjustment timing related to the second resource RS2 may include one or more timings, e.g., timings T21 to T23. The frequency adjuster 115 may determine whether the sum of reference power consumption amounts of all resources in operation, which include the second resource RS2, exceeds the power budget at the adjustment timing related to the second resource RS2, and determine the operating frequencies according to the determined result.

Referring to FIG. 3C, the entire operation period of the third resource RS3 may be divided into partial operation periods RG31 and RG32. The partial operation period RG31 from timing T31 to timing T32 may indicate a period in which a set percentage, e.g., 50%, of the operation of the third resource RS3 has been performed or completed. The partial operation period RG32 from timing T32 to timing T33 may indicate the remainder of the entire operation period, excluding the partial operation period RG31. The third resource RS3 may consume reference power PW31 during both of the partial operation periods RG31 and RG32.

The adjustment timing related to the third resource RS3 may include one or more timings among the timings T31 to T33. The frequency adjuster 115 may determine whether the sum of reference power consumption amounts of all resources in operation, which include the third resource RS3, exceeds the power budget at the adjustment timing related to the third resource RS3, and determine the operating frequencies according to the determined result.

Since the reference power consumption amounts of the first to third resources RS1 to RS3 illustrated in FIGS. 3A to 3C are determined through an experiment in advance, the partial operation periods and the timings may be determined through an experiment in advance.

FIG. 4 illustrates a table indicating the relationship between partial operation period and reference power consumption (hereinafter "reference power consumption table") RGPWT.

The reference power consumption table RGPWT may include the partial operation periods and the reference power consumption amounts of the partial operation periods for the respective resources RS1 to RSn.

By referring to the reference power consumption table RGPWT of FIG. 4, the frequency adjuster 115 of FIG. 1 may determine, while the first to third resources RS1 to RS3 are operated, which partial operation periods are in progress, what the reference power consumption amounts are and whether the adjustment timing has arrived, and perform the frequency adjusting operation according to the above-described method.

In FIGS. 3A to 3C and FIG. 4, each of the first to third resources RS1 to RS3 may have two partial operation periods, for example. However, the number of partial operation periods is not limited thereto.

The allowable amounts of power of the resources at the above-described adjustment timing may be determined according to the priorities of the resources.

The resources may be given predetermined priorities, when processing tasks. The priorities of the resources may be decided according to various standards.

For example, a resource may be given a high priority when processing a task related to a request of the host device. On the other hand, a resource may be given a low priority when processing a task related to a background operation of the memory system 100 in the absence of a request of the host device.

For another example, a resource may be given a high priority when the average processing time for tasks is shorter than a reference time. On the other hand, a resource may be given a low priority when the average processing time for tasks is longer than the reference time.

For another example, a resource may be given a high priority when processing a task related to a read operation of the memory device 120. On the other hand, a resource may be given a low priority when processing a task related to a write operation of the memory device 120.

The priorities of the resources may be given as two levels which are divided into high and low, three levels which are divided into high, intermediate and low, or four or more levels.

In accordance with an embodiment, the frequency adjuster 115 may determine the priorities of the resources. When the priority of a certain resource is higher than the reference level, the frequency adjuster 115 may determine the allowable power of the resource, such that the ratio of the allowable power to the reference power consumption of the corresponding resource is higher than the reference ratio.

Figure 5:
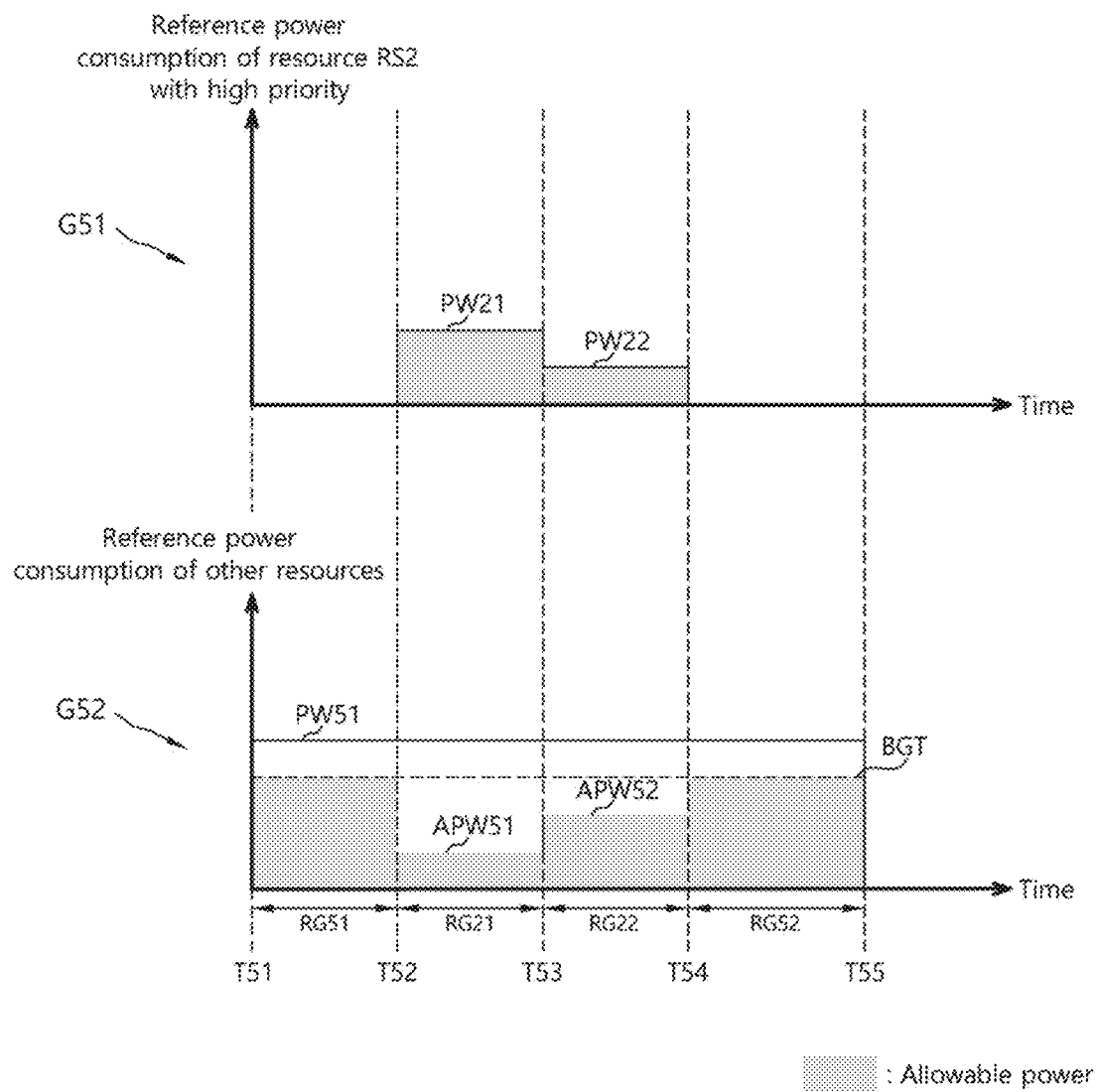
FIG. 5 illustrates a method for determining allowable amounts of power according to the priorities of resources in accordance with an embodiment.

FIG. 5 illustrates a method for determining allowable amounts of power according to the priorities of the resources. For example, the frequency adjuster 115 of FIG. 1 may determine the allowable amounts of power according to the priorities of the resources.

In a graph G52 of FIG. 5, one or more resources may be operating during a period from timing T51 to timing T55. In a graph G51, the second resource RS2 having a high priority may operate from the timing T52 to the timing T54. The timings T52 to T54 related to the second resource RS2 may correspond to adjustment timings for adjusting frequencies as described above with reference to FIG. 3B.

Referring to FIG. 5, one or more resources may be operating in a period RG51. For example, the resources which are operating in the period RG51 may have the same priorities which are lower than the reference level. When the sum PW51 of the reference power consumption amounts of the resources which are operating in the period RG51 exceeds the power budget BGT, the frequency adjuster 115 may determine the allowable amounts of power of the resources in order to adjust the operating frequencies of the resources. The sum of the allowable amounts of power of the resources, i.e. the total allowable power may coincide with the power budget BGT. A method for distributing allowable amounts of power to resources having the same priorities will be described in detail below with reference to FIG. 6.

When the second resource RS2 starts to operate at the adjustment timing T52, the frequency adjuster 115 may determine that the second resource RS2 has a higher priority than the reference level. Therefore, the frequency adjuster 115 may set the allowable power ratio to 1 in the partial operation period RG21 of the second resource RS2. That is, the second resource RS2 having a high priority may operate at the reference operating frequency to consume the reference power PW21.

The frequency adjuster 115 may distribute the rest of the power APW51 of the power budget BGT to the other resources. The rest of the power APW51 may be obtained by subtracting the allowable power PW21 of the second resource RS2 from the power budget BGT.

At the adjustment timing T53, the frequency adjuster 115 may set the allowable power ratio to 1 in the partial operation period RG22 of the second resource RS2 having a high priority. That is, the second resource RS2 having a high priority may operate at the reference operating frequency to consume the reference power PW22.

The frequency adjuster 115 may distribute the rest of the power APW52 of the power budget BGT to the other resources. The rest of the power APW52 may be obtained by subtracting the allowable power PW22 of the second resource RS2 from the power budget BGT.

When the second resource RS2 ends the operation at the adjustment timing T54, the frequency adjuster 115 may determine that the sum PW51 of the reference power consumption amounts of the resources which are operating in the period RG52 exceeds the power budget BGT. The frequency adjuster 115 may determine the allowable amounts of power of the resources in order to adjust the operating frequencies of the resources.

Figure 6:
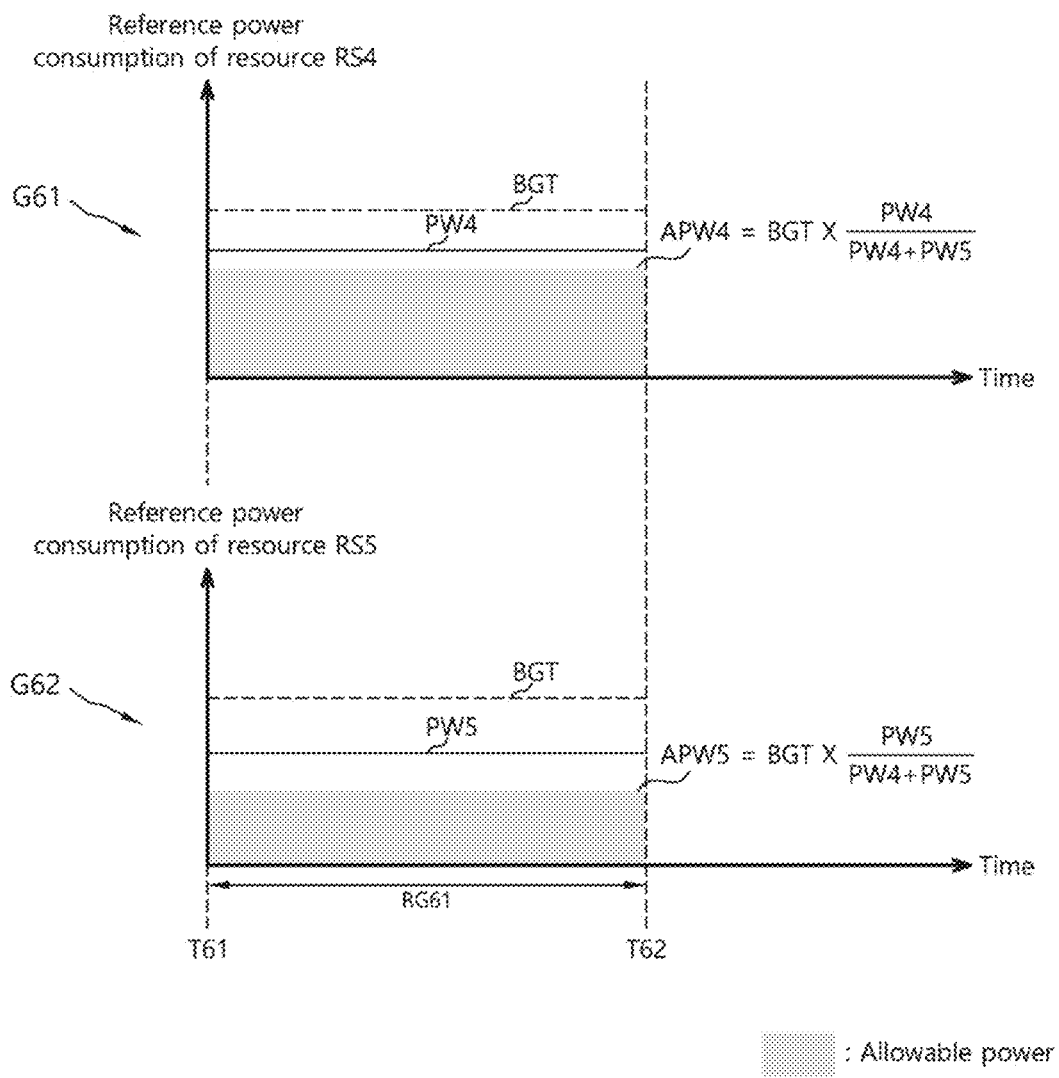
FIG. 6 illustrates a method of distributing allowable amounts of power to different resources having the same priority in accordance with an embodiment.

FIG. 6 illustrates a method of distributing allowable amounts of power to resources having the same priority in accordance with an embodiment. For example, FIG. 6 illustrates that the frequency adjuster 115 of FIG. 1 distributes allowable amounts of power to the fourth and fifth resources RS4 and RS5 having the same priority. In FIG. 6, a graph G61 may indicate the reference power consumption of the fourth resource RS4, and a graph G62 may indicate the reference power consumption of the fifth resource RS5. The fourth and fifth resources RS4 and RS5 may operate at the same time in a period RG61 from timing T61 to timing T62. The fourth and fifth resources RS4 and RS5 may have the same priority. FIG. 6 illustrates that the allowable amounts of power are distributed to two resources, i.e., the fourth and fifth resources RS4 and RS5. However, a method for distributing allowable amounts of power to three or more resources may be performed in a similar manner.

Referring to FIG. 6, the sum of the reference power consumption amounts PW4 and PW5 of the fourth and fifth resources RS4 and RS5 may exceed the power budget BGT. Therefore, the frequency adjuster 115 may divide the power budget BGT into allowable amounts of power APW4 and APW5 of the fourth and fifth resources RS4 and RS5 according to the ratio of the reference power consumption amounts PW4 and PW5 of the fourth and fifth resources RS4 and RS5, respectively.

For example, the allowable power of a certain resource may be calculated according to Equation 1 below. The total reference power consumption may correspond to the sum of reference power consumption amounts of resources to which allowable amounts of power are to be distributed.

Allowable power of resource=power budget×(reference power consumption of resource/total reference power consumption) [Equation 1]

The resources may receive only a part of the power budget as the allowable amounts of power as in the period RG21 of FIG. 5, for example. In this case, the frequency adjuster 115 may divide the remaining power budget into the allowable amounts of power of the corresponding resources according to the ratio of the reference power consumption amounts of the resources. For example, the allowable power of a certain resource may be calculated by substituting the remaining power budget for the power budget in Equation 1.

Figure 7:
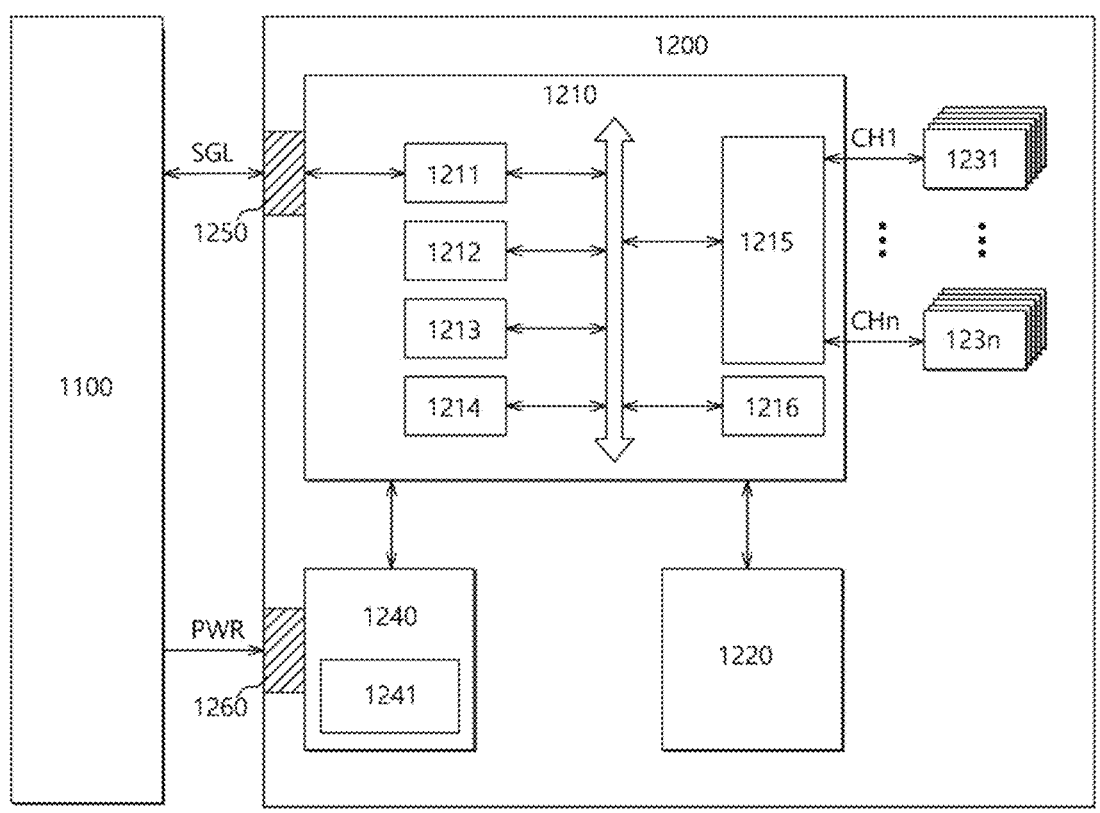
FIG. 7 is a diagram illustrating a data processing system including a solid state drive (SSD) in accordance with an embodiment.

FIG. 7 illustrates a data processing system 1000 including a solid state drive (SSD) 1200 in accordance with an embodiment. Referring to FIG. 7, the data processing system 1000 may include a host device 1100 and the SSD 1200.

The SSD 1200 may include a controller 1210, a buffer memory device 1220, nonvolatile memory devices 1231 to 123n, a power supply 1240, a signal connector 1250 and a power connector 1260.

The controller 1210 may control the overall operations of the SSD 1200. The controller 1210 may include a host interface 1211, a control component 1212, a random access memory (RAM) 1213, an error correction code (ECC) component 1214, a memory interface 1215, and a clock generator 1216.

The host interface 1211 may exchange signals SGL with the host device 1100 through the signal connector 1250. The signals SGL may include a command, address, data and the like. The host interface 1211 may interface the host device 1100 and the SSD 1200 according to a protocol of the host device 1100. For example, the host interface 1211 may communicate with the host device 1100 through any one of standard interface protocols such as secure digital, universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-e or PCIe), and universal flash storage (UFS).

The control component 1212 may analyze and process the signals SGL inputted from the host device 1100. The control component 1212 may control operations of background function blocks according to firmware or software for driving the SSD 1200. The RAM 1213 may be used as a working memory for driving such firmware or software.

The ECC component 1214 may generate parity data for data which are to be transferred to the nonvolatile memory devices 1231 to 123n. The generated parity data may be stored in the nonvolatile memory devices 1231 to 123n with the data. The ECC component 1214 may detect an error of data read from the nonvolatile memory devices 1231 to 123n, based on the parity data. When the detected error falls within a correctable range, the ECC component 1214 may correct the detected error.

The memory interface 1215 may provide a control signal such as a command and address to the nonvolatile memory devices 1231 to 123n according to control of the control component 1212. The memory interface 1215 may exchange data with the nonvolatile memory devices 1231 to 123n according to control of the control component 1212. For example, the memory interface 1215 may provide data stored in the buffer memory device 1220 to the nonvolatile memory devices 1231 to 123n, or provide data read from the nonvolatile memory devices 1231 to 123n to the buffer memory device 1220.

The clock generator 1216 may generate clock signals to resources in the SSD 1200, respectively. The clock generator 1216 may be configured in substantially the same manner as the clock generator 111 of FIG. 1. That is, the clock generator 1216 may adjust the frequencies of the clock signals at an adjustment timing. The clock generator 1216 may determine allowable amounts of power for the resources in consideration of the priorities and basic power consumption amounts of the resources, and adjust frequencies based on the allowable amounts of powers.

The buffer memory device 1220 may temporarily store data which are to be stored in the nonvolatile memory devices 1231 to 123n. The buffer memory device 1220 may temporarily store data read from the nonvolatile memory devices 1231 to 123n. The data stored in the buffer memory device 1220 may be transferred to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled to the controller 1210 through a plurality of channels CH1 to CHn, respectively. One channel may be coupled to one or more nonvolatile memory devices. The nonvolatile memory devices coupled to one channel may be coupled to the same signal bus and data bus.

The power supply 1240 may provide power PWR inputted through the power connector 1260 to the SSD 1200 during a background operation. The power supply 1240 may include an auxiliary power supply 1241. The auxiliary power supply 1241 may supply power to normally end the SSD 1200, when a sudden power off occurs. The auxiliary power supply 1241 may include one or more high-capacity capacitors.

The signal connector 1250 may include various types of connectors depending on the interfacing scheme between the host device 1100 and the SSD 1200.

The power connector 1260 may include various types of connectors depending on the power supply scheme of the host device 1100.

Figure 8:
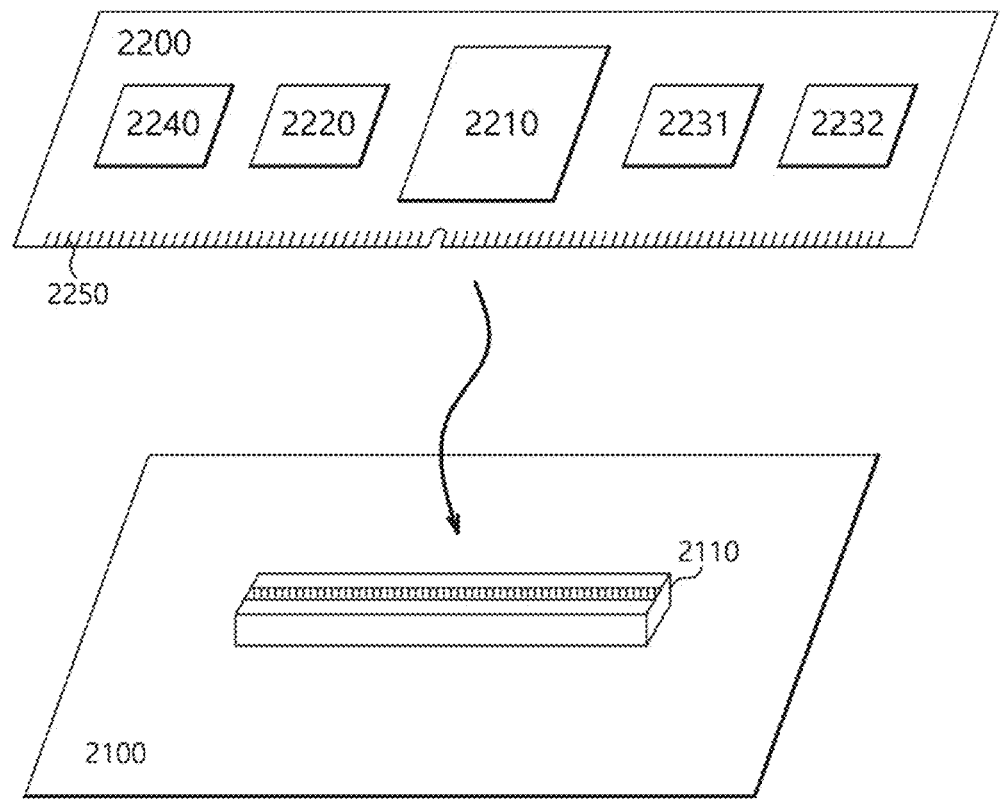
FIG. 8 is a diagram illustrating a data processing system including a memory system in accordance with an embodiment.

FIG. 8 is a diagram illustrating a data processing system 2000 including a memory system 2200 in accordance with an embodiment. Referring to FIG. 8, the data processing system 2000 may include a host device 2100 and the memory system 2200.

The host device 2100 may be implemented in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be implemented in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 7.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 9:
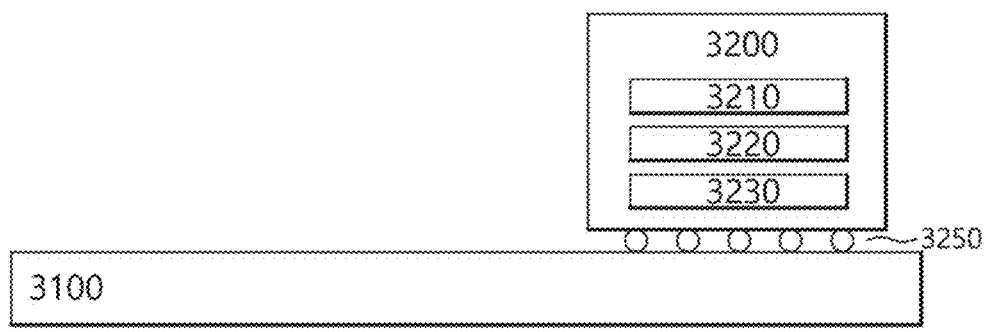
FIG. 9 is a diagram illustrating a data processing system including a memory system in accordance with an embodiment.

FIG. 9 is a diagram illustrating a data processing system 3000 including a memory system 3200 in accordance with an embodiment. Referring to FIG. 9, the data processing system 3000 may include a host device 3100 and the memory system 3200.

The host device 3100 may be implemented in the form of a board such as a printed circuit board. Although not shown, the host device 3100 may include internal function blocks for performing the function of a host device.

The memory system 3200 may be implemented in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 7.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 10:
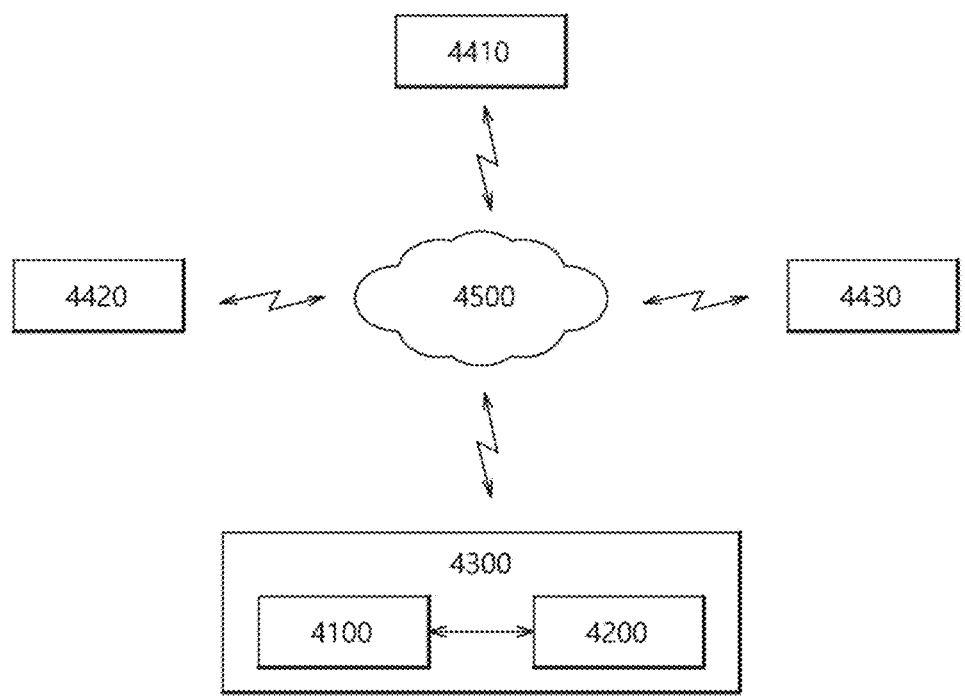
FIG. 10 is a diagram illustrating a network system including a memory system in accordance with an embodiment.

FIG. 10 is a diagram illustrating a network system 4000 including a memory system 4200 in accordance with an embodiment. Referring to FIG. 10, the network system 4000 may include a server system 4300 and a plurality of client systems 4410 to 4430 which are coupled through a network 4500.

The server system 4300 may provide data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 7, the memory system 2200 shown in FIG. 8 or the memory system 3200 shown in FIG. 9.

While various embodiments have been described above, it will be understood to those skilled in the art that the embodiments described may be varied or modified in different ways. Accordingly, the present invention is not limited to the described embodiments. Rather, the present invention encompasses all such variations and modifications that fall within the scope of the claims.

What is claimed is:

1. A memory system comprising:
   a plurality of resources; and
   a frequency adjuster configured to adjust operating frequencies of the plurality of resources at a predetermined adjustment timing during operations of the plurality of resources,
   wherein the adjustment timing comprises at least one timing for dividing partial operation periods of at least one resource among the plurality of resources.

2. The memory system of claim 1, wherein the frequency adjuster divides a power budget into allowable amounts of power to allow to the plurality of resources, respectively, at the adjustment timing, and determines the operating frequencies based on the allowable amounts of power.

3. The memory system of claim 2, wherein the frequency adjuster determines the operating frequencies by referring to an operating frequency table, and
   the operating frequency table comprises operating frequencies corresponding to the allowable amounts of power of the respective plurality of resources.

4. The memory system of claim 2, wherein the frequency adjuster determines an allowable amount of power of a first resource, of the plurality of resources, such that a ratio of the allowable amount of power of the first resource to reference power consumption of the first resource is higher than a reference ratio, when the priority of the first resource is higher than a reference priority at the adjustment timing.

5. The memory system of claim 4, wherein the frequency adjuster determines an operating frequency of the first resource by adjusting a reference operating frequency of the first resource according to the ratio of the allowable amount of power.

6. The memory system of claim 2, wherein the frequency adjuster determines a ratio of reference power consumption amounts of the plurality of resources at the adjustment timing, and divides the power budget into the allowable amounts of power according to the ratio of the reference power consumption amounts.

7. The memory system of claim 6, wherein the frequency adjuster determines a ratio of an allowable amount of power of a first resource, of the plurality of resources, to a reference power consumption amount of the first resource based on the allowable amounts of power, and determines an operating frequency of the first resource by adjusting a reference operating frequency of the first resource according to the ratio of the allowable amount of power.

8. The memory system of claim 2, wherein the frequency adjuster adjusts the operating frequencies by adjusting reference operating frequencies of the resources when a sum of reference power consumption amounts of the resources exceeds the power budget at the adjustment timing, and retains the reference operating frequencies of the resources when the sum of the reference power consumption amounts does not exceed the power budget.

9. The memory system of claim 1, wherein the partial operation periods comprise a peak power operation period of the resource.

10. The memory system of claim 1, wherein the partial operation periods are divided at one of a timing at which reference power consumption of the resource is rapidly changed and a timing at which an operation of the resource has been performed up to a set percentage of completion.

11. An operating method of a memory system, comprising adjusting operating frequencies of a plurality of resources at a predetermined adjustment timing during operations of the plurality of resources,
   wherein the adjustment timing comprises at least one timing for dividing partial operation periods of at least one resource among the plurality of resources.

12. The operating method of claim 11, wherein the adjusting of the operating frequencies comprises:
   dividing a power budget into allowable amounts of power to allow to the plurality of resources at the adjustment timing; and
   adjusting the operating frequencies based on the allowable amounts of power.

13. The operating method of claim 12, wherein the adjusting of the operating frequencies comprises determining the operating frequencies by referring to an operating frequency table, and
   wherein the operating frequency table comprises operating frequencies corresponding to the allowable amounts of power of the respective plurality of resources.

14. The operating method of claim 12, wherein the dividing of the power budget into the allowable amounts of power comprises determining an allowable amount of power of a first resource, such that a ratio of the allowable amount of power of the first resource to reference power consumption of the first resource is higher than a reference ratio, when the priority of the first resource is higher than a reference priority at the adjustment timing.

15. The operating method of claim 14, wherein the adjusting of the operating frequencies comprises deciding an operating frequency of the first resource by adjusting a reference operating frequency of the first resource according to the ratio of the allowable amount of power.

16. The operating method of claim 12, wherein the dividing of the power budget into the allowable amounts of power comprises:
   determining a ratio of reference power consumption amounts of the plurality of resources at the adjustment timing; and
   dividing the power budget into the allowable amounts of power according to the ratio of the reference power consumption amounts.

17. The operating method of claim 16, wherein the adjusting of the operating frequencies comprises:
   determining a ratio of an allowable amount of power of a first resource to reference power consumption of the first resource based on the allowable amounts of power; and
   deciding an operating frequency of the first resource by regulating a reference operating frequency of the first resource according to the ratio of the allowable amount of power.

18. The operating method of claim 12, wherein the adjusting of the operating frequencies comprises:
   adjusting the operating frequencies by adjusting reference operating frequencies of the plurality of resources, when a sum of reference power consumption amounts of the plurality of resources exceeds the power budget at the adjustment timing; and
   retaining the reference operating frequencies of the plurality of resources when the sum of the reference power consumption amounts does not exceed the power budget.

19. The operating method of claim 11, wherein the partial operation periods comprise a peak power operation period of the resource.

20. The operating method of claim 11, wherein the partial operation periods are divided at one of a timing that reference power consumption of the resource is rapidly changed, or a timing that an operation of the resource has been performed up to a predetermined progress.

21. A memory system comprising:
a memory device; and
a controller configured to control the memory device,
wherein the controller includes a plurality of resources, each corresponding to a hardware element for at least one operation of the memory device, and
a frequency adjuster configured to adjust an allowable amount of power for each of the plurality of resources at a set adjustment timing during operations of the plurality of resources based on a power budget and priorities of the plurality of resources.

* * * * *